United States Patent
Seimetz et al.

(10) Patent No.: US 11,606,910 B2
(45) Date of Patent: Mar. 21, 2023

(54) CROP THROUGHPUT SENSING SYSTEM FOR A HARVESTING MACHINE

(71) Applicant: Deere & Company, Moline, IL (US)

(72) Inventors: Martin Seimetz, Heusweiler (DE); Kilian Wolff, Mandelbachtal (DE); Benedikt Jung, Kaiserslautern (DE); Pierre Dommange, Dijon (FR); Daniel E. Derscheid, Hedrick, IA (US); Cole L. Murray, Polk City, IA (US)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 16/791,796

(22) Filed: Feb. 14, 2020

(65) Prior Publication Data
US 2020/0260645 A1    Aug. 20, 2020

Related U.S. Application Data

(60) Provisional application No. 62/805,764, filed on Feb. 14, 2019.

(51) Int. Cl.
*A01D 41/127* (2006.01)
*A01F 15/10* (2006.01)

(52) U.S. Cl.
CPC .......... *A01F 15/10* (2013.01); *A01D 41/1271* (2013.01); *A01F 2015/107* (2013.01)

(58) Field of Classification Search
CPC ............ A01D 41/1271; A01D 41/1274; A01D 43/086; A01F 15/0825; A01F 15/10; A01F 15/106; A01F 2015/107
See application file for complete search history.

(56) References Cited

U.S. PATENT DOCUMENTS

| | | | |
|---|---|---|---|
| 6,401,549 B1 * | 6/2002 | Ohlemeyer | A01D 43/085 73/861.73 |
| 9,357,709 B2 * | 6/2016 | Waechter | A01D 69/002 |
| 9,713,306 B2 * | 7/2017 | Singh | A01F 15/07 |
| 10,477,775 B2 * | 11/2019 | Lang | A01F 15/0825 |
| 10,694,670 B2 * | 6/2020 | Gresch | A01B 69/001 |
| 2007/0175198 A1 | 8/2007 | Viaud et al. | |
| 2008/0028738 A1 * | 2/2008 | Viaud | A01F 15/106 56/341 |
| 2012/0238335 A1 * | 9/2012 | Derscheid | A01F 29/10 460/6 |
| 2014/0021018 A1 | 1/2014 | Biziorek | |

(Continued)

FOREIGN PATENT DOCUMENTS

| | | |
|---|---|---|
| DE | 19543343 A1 | 5/1997 |
| DE | 102004052446 A1 | 1/2007 |

(Continued)

OTHER PUBLICATIONS

European Search Report issued in counterpart application No. 20156816.9 dated Jun. 19, 2020 (06 pages).

*Primary Examiner* — Alicia Torres
(74) *Attorney, Agent, or Firm* — Hanley, Flight & Zimmerman, LLC

(57) ABSTRACT

A harvesting machine comprises a crop conveying channel with a movable bottom flap coupled to a hydraulic actuator controlling the position of the flap and a crop throughput sensing arrangement with a pressure sensor adapted to sense a hydraulic pressure in the hydraulic actuator.

16 Claims, 2 Drawing Sheets

(56) References Cited

U.S. PATENT DOCUMENTS

| | | | |
|---|---|---|---|
| 2018/0027734 A1* | 2/2018 | Hien | G01F 1/30 |
| 2018/0141436 A1* | 5/2018 | Muench | A01D 69/03 |
| 2018/0317388 A1* | 11/2018 | Gresch | A01B 79/005 |
| 2018/0317395 A1* | 11/2018 | Devroe | A01F 15/101 |
| 2021/0185934 A1* | 6/2021 | Weller | A01F 15/07 |

FOREIGN PATENT DOCUMENTS

| | | | | |
|---|---|---|---|---|
| DE | 102013100793 A1 | | 7/2014 | |
| EP | 1153538 A2 | | 11/2001 | |
| EP | 1972191 A1 | | 9/2008 | |
| EP | 2250876 A1 | | 11/2010 | |
| EP | 1443814 B1 | * | 9/2015 | A01D 43/085 |
| EP | 3001894 A1 | | 4/2016 | |
| EP | 3103323 A1 | | 12/2016 | |
| EP | 3398420 A1 | | 11/2018 | |

* cited by examiner

CROP THROUGHPUT SENSING SYSTEM FOR A HARVESTING MACHINE

FIELD OF INVENTION

The present invention relates to a crop throughput sensing system for a harvesting machine.

BACKGROUND

Harvesting machines are used in agriculture to take up or cut crop from a field and to process and/or bale the crop. For numerous purposes, like controlling the forward speed of the harvesting machine or to record it in a geo-referenced manner in a database, it is useful to sense the throughput of the harvesting machine, i.e. the amount of crop taken up or processed per time unit.

In the prior art, it was for example proposed to sense the load of work elements of a harvesting machine, like take-up, cutting, feeding, pre-compressing, processing or pressing means of a baler by strain gauges, rotation speed, pressure or temperature sensors on drive shafts or chains or drive rods of a baler, which depend on the amount of crop actually conveyed or processed, in order to measure the actual throughput for yield mapping (German Patent Application No. DE 195 43 343 A1). Torque or pressure sensors interacting with a pick-up, feeding rotor or feed rake are also used for controlling the propelling speed of a tractor towing a baler (German Patent Application No. DE 10 2013 100 793 A1). In a baler, it was also proposed to sense the crop mass based on vertical forces acting on the bottom of a pre-compressing chamber (European Patent Application No. EP 3 001 894 A1) or the position of a spring-biased sensing door on the bottom of a pre-compressing chamber (European Patent Application No. EP 1 153 538 A2) for controlling the baler forward speed based on throughput.

Some harvesting machines comprise channels in which crop is conveyed, which channels have a bottom flap that can be opened by means of a hydraulic actuator in case that plugged crop needs to be removed (European Patent Application No. EP 2 250 876 A1, European Patent Application No. EP 1 972 191 A1).

The (torque or force or position) sensors interacting with driven elements or movable parts of the harvesting machine require additional elements, like strain gauges or potentiometers and thus add complexity to the harvesting machine.

SUMMARY

According to an aspect of the present disclosure, a harvesting machine, like a baler, forage loading wagon, forage harvester or combine harvester, has a crop conveying channel with a movable flap coupled to at least one hydraulic actuator adapted to move the flap between a closed position and an opened position. A crop throughput sensing arrangement comprises a pressure sensor adapted to sense a hydraulic pressure in the hydraulic actuator.

The hydraulic actuator can be a hydraulic cylinder with a first chamber, the hydraulic cylinder coupled to the flap in a manner such that pressurization of the first chamber biases the flap in a closed position, wherein the pressure sensor is in a fluid connection with the first chamber.

The first chamber of the hydraulic actuator can be connected to a first valve, the first valve closed during a harvesting operation.

The hydraulic actuator can be a hydraulic cylinder with a first chamber and a second chamber, the hydraulic cylinder coupled to the flap in a manner such that pressurization of the first chamber biases the flap in a closed position and pressurization of the second chamber provides an opening force to the flap, wherein the pressure sensor is in a fluid connection with at least one of the first chamber and second chamber.

The first chamber of the hydraulic actuator can be connected to a first valve, the first valve closed during a harvesting operation. Alternatively or additionally, the second chamber of the hydraulic actuator can be connected to a second valve, the second valve closed during a harvesting operation.

The first valve and/or second valve can be controlled by an electronic control unit adapted to control the position of the flap by actuation of at least one of the first valve and the second valve and a third valve, the third valve adapted to connect at least one of the first valve and the second valve selectively to one of a source of pressurized fluid and a fluid tank.

The electronic control unit can be adapted to open the first valve and/or the second valve one of before start of a harvesting operation and during a harvesting operation and, with the first valve and the second valve open, control the third valve to provide a predetermined pressure in the first chamber and then to close the first valve and/or second valve for a harvesting operation.

The electronic control unit can be adapted to open the first valve and/or the second valve one of before start of a harvesting operation and during a harvesting operation and, with the first valve and/or the second valve open, while a pressure relief valve provides a predetermined pressure in the first chamber and then to close the first valve and/or second valve for a harvesting operation.

The electronic control unit can be adapted to open the first valve and/or the second valve during a harvesting operation once one or more of the following conditions are fulfilled: the amount of crop flow in the crop conveying channel is below a predetermined threshold, the harvesting machine is not moving forward, a predetermined time interval has elapsed and a bale is being wrapped.

The crop conveying channel can be located on a baler downstream a crop feeding rotor and upstream a baling chamber.

The flap can be pivotable around an axis extending transversely a longitudinal axis of the crop conveying channel and the actuator can be connected to the flap by a lever arm.

The pressure sensor can have a signal output connected to an electronic control unit which is adapted, based on the signal of the pressure sensor, to at least one of: (a) store pressure values or throughput values derived therefrom in a geo-referenced manner, (b) control a forward speed of the harvesting machine, (c) command an actuator to at least one of open the flap, raise a pick-up, disengage crop cutting knifes in the crop conveying channel, stop a PTO driving the harvesting machine and reduce a pressure in a baling chamber once the pressure of the crop within the channel acting onto the flap exceeds a threshold value and (d) control a user interface at an operator station to display a throughput value.

DETAILED DESCRIPTION OF THE DRAWINGS

Figure 1:
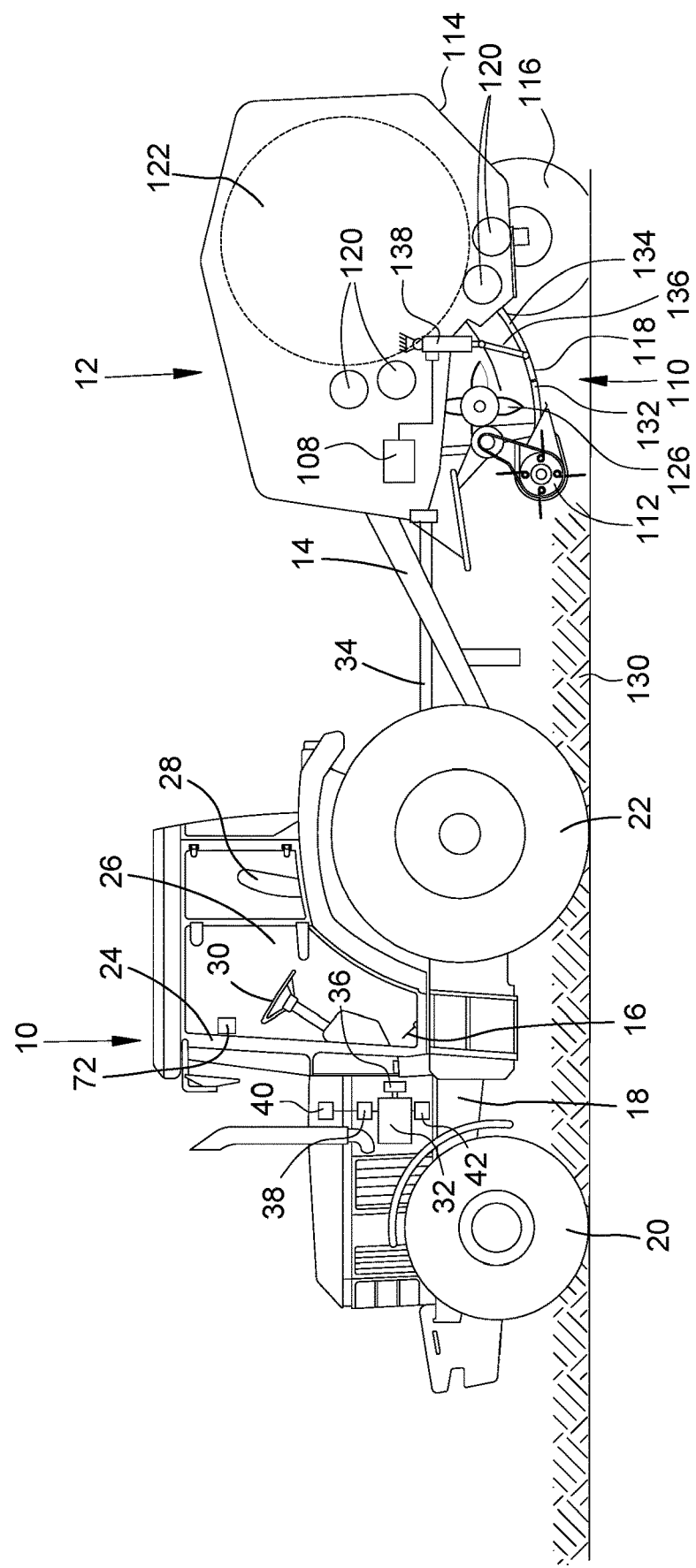
FIG. 1 is a lateral view of a tractor with a round baler.

FIG. 1 shows a lateral view of tractor 10 and a round baler 12 coupled to a drawbar hitch 15 of the tractor 10 by means of a drawbar 14. The tractor 10 is supported on a frame 18, which is supported on steerable front wheels 20 and movable rear wheels 22, and supports a cabin 24 wherein the operators workstation 26 is located. In the following, direction indications as front and rear, left and right, are given with respect to the normal forward direction of the tractor 10 that goes in FIG. 1 to the left.

The operators workstation 26 includes a seat 28, a steering wheel 30, a gas pedal 16, and another pedal for the brake and clutch (not shown), and a user interface 72 with input elements arranged in the operators workstation 26 within reach of the operator for setting selectable functions of the tractor 10.

The tractor 10 comprises an engine 32 driving a PTO 36 to which a shaft 34 for driving the baler 12 is connected. A tractor controller 40 connected to the user interface 72 controls the engine 32 by means of an engine controller 38. The engine 32 also drives the wheels 22 and optionally 20 by means of a transmission 42.

The baler 12 comprises a baler frame 114 supported on wheels 116. The frame 114 supports a baling chamber 122 surrounded by rollers 120. Below the front edge of the baler 12, a pick-up 112 with tines moving or rotating around a transverse axis followed in a crop flow direction by a rotor 126. The pick-up 112 collects during operation crop lying in a swath 130 of grass, hay or straw on the field and feeds it into the baling chamber 122. The baler-tractor combination and its operation is described for example in US Patent Publication No. 2007/0175198 A1, the subject matter of which incorporated herein by reference. Instead of the baler 12 with a baling chamber 122 of fixed size, as shown, a round baler with a chamber of variable chamber size or a square baler with a plunger for compressing the crop could be used.

Figure 2:
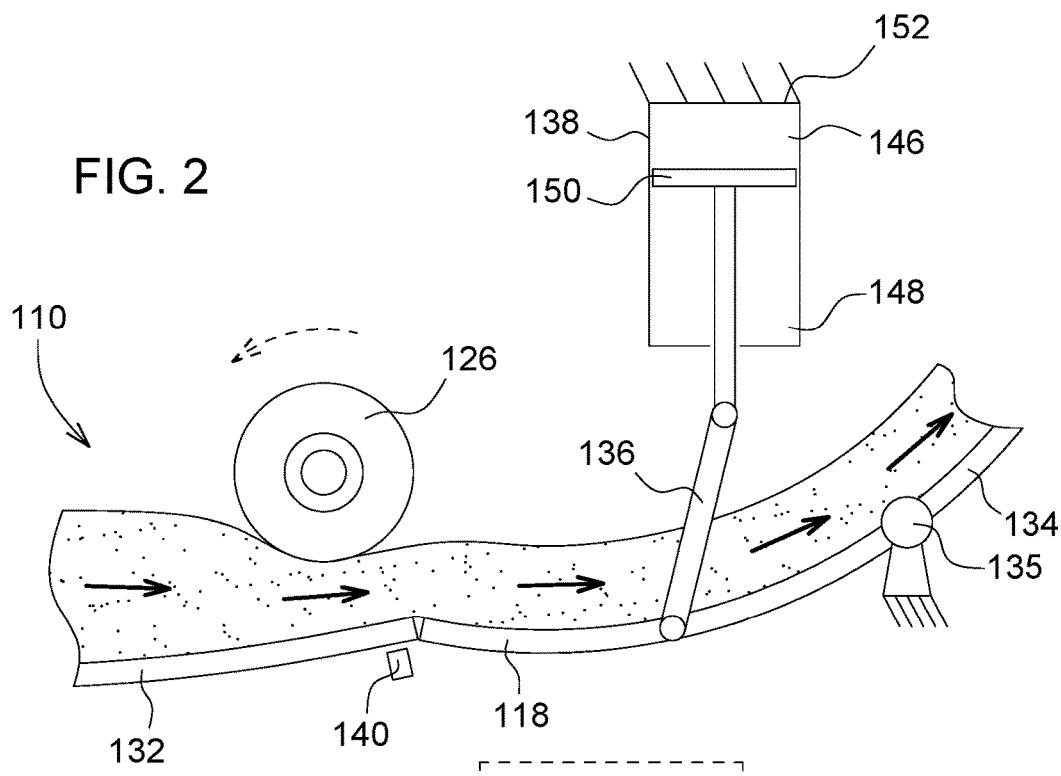
FIG. 2 is a vertical section through the crop conveying channel of the baler.

As shown in FIGS. 1 and 2, the crop conveying channel 110 of the baler 12, located between the pick-up 112 and the baling chamber 122, comprises a bottom with two parts 132, 134 fixed to the frame 114 and a movable flap 118 between the fixed parts 132, 134. The flap 118 extends over the width of the crop conveying channel 110 and is, at its downstream (rear) end pivotally supported on the frame 114 around a horizontal, transversely extending axis. The outer edges of the flap 118 are pivotally connected to lever arms 136 which are also pivotally connected to one of two hydraulic actuators 138, respectively, which are connected to the frame 114. In the embodiment shown, the housing 152 of hydraulic actuators 138 is connected to the frame 114, while the piston 150 is pivotally connected to the arm 136. One of the hydraulic actuators 138 is optional.

The hydraulic actuators 138 are thus operable to move the flap 118 around a pivot axis 135 which is located at the rear end of flap 118 and extends in the horizontal and transverse direction, between a closed position, as shown in FIGS. 1 and 2, and an open position, in which the flap 118 is tilted around axis 135 towards the ground and allows to remove plugged crop from the crop conveying channel 110, either by gravity of by operator interaction. Pressurization of the rod chamber 148 thus pulls arm 136 upwards and closes flap 118 and pressurization of the piston chamber 146 thus pushes arm 136 downwards and opens flap 118.

The position of the flap 138 is sensed by a suitable position sensor 140, which can comprise for example a mechanical switch interacting with the flap 118 and closing or opening in case that the flap 118 is in the closed position and open or closed otherwise. The signal of the position sensor 140 is transmitted to a baler controller 108, which controls a number of valves for operating the hydraulic actuator 138.

A first valve 154 is connected to the rod chamber 148 of the actuators 138 and a second valve 156 connected to the piston chamber 146 of the actuators 138. Both valves 154, 156 are controlled by the baler controller 108. The baler controller 108 would thus open the first valve 154 to pressurize the rod chamber 148 for closing the flap 118 and open the second valve 156 to pressurize the piston chamber 146 for opening the flap 118.

Figure 3:
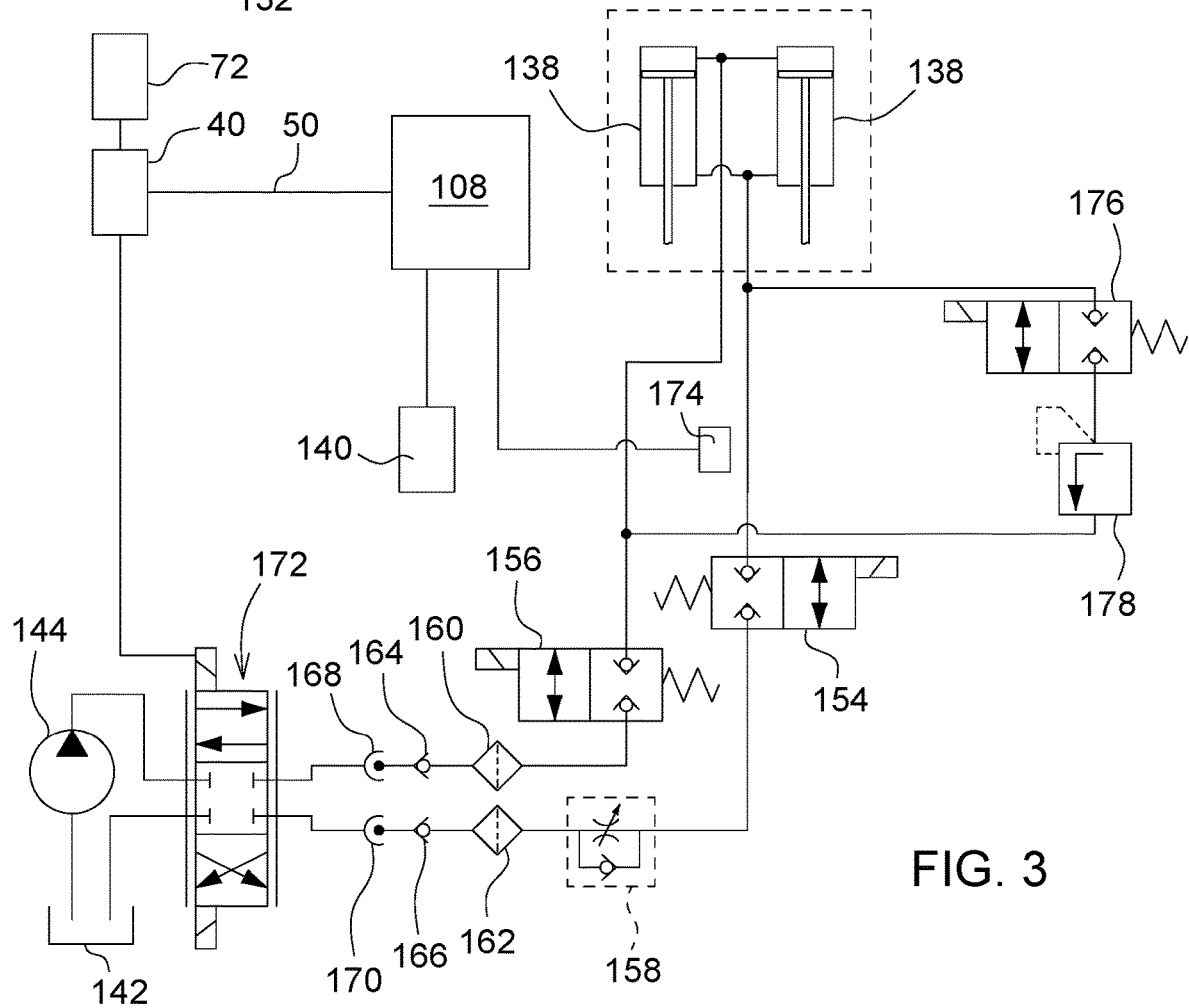
FIG. 3 is a hydraulic scheme of the control arrangement of the actuator of the flap on the bottom of the crop conveying channel of the baler.

FIG. 3 shows a diagram indicating how the hydraulic actuators 138 are operated. Hydraulic fluid is stored in a tank 142 and pressurized by a pump 144. The output of the pump 144 and a line to tank 142 are connected to a third (proportional) valve 172 which has a first output to a releasable connection 168, to a check valve 164, to a filter 160 and to the second valve 156. The third valve 172 also has second output to a releasable connection 170, to a check valve 166, to a filter 162, a diaphragm 158 with a parallel check valve and to the first valve 154. The third valve 172 is controlled by the tractor controller 40, which is connected to the baler controller 108 by a bus 50 (for example according to ISO 11783).

The baler controller 108 is thus operable to control the position of the flap 118. For example, if the operator at his work station 26 actuates the user interface 72 to open the flap 118, for example in order to remove plugged crop from the crop conveying channel 110, the instruction will be sent via the bus 50 to baler controller 108, which will instruct the tractor controller 40 to move third valve 172 from the shown rest position downward to provide pressurized fluid on the input of the second valve 156. The baler controller 108 then also opens the second valve 156, such that the piston chamber 146 is pressurized. At the same time, the first valve 154 is opened to allow hydraulic fluid to escape from the rod chamber 148 into the tank 142.

Analogously, if the operator instructs the user interface 72 to close the flap 118, the instruction will be sent via the bus 50 to baler controller 108, which will instruct the tractor controller 40 to move third valve 172 from the shown rest position upward to provide pressurized fluid on the input of the first valve 154. The baler controller 108 then also opens the first valve 154, such that the rod chamber 148 is pressurized. At the same time, the second valve 156 is opened to allow hydraulic fluid to escape from the piston chamber 146 into the tank 142. In the embodiment shown in FIG. 3, the tank 142, pump 144 and third valve 172 are mounted on board of the tractor 10, but it would be possible to mount the third valve 172—then directly controlled by baler controller 108—or all of the mentioned components on board of the baler 12.

As shown in FIG. 3, a pressure sensor 174 sensing the hydraulic pressure in the line between the first valve 154 and the rod chamber 148 is provided, providing its output signal to the baler controller 108. It would also be possible to connect the pressure sensor 174 at any position where it is capable of sensing the hydraulic pressure in the rod chamber 148 or in the piston chamber 146. The signal of pressure sensor 174 contains information about the pressure with which the crop above flap 118 acts onto the flap 118, and thus about the amount of crop within the crop conveying channel 110, with the pressure in the rod chamber 148 increasing with crop flow and the pressure in the piston chamber 146 decreasing with increasing crop flow.

The signal of pressure sensor 174 can thus be used by the baler controller 108 to provide a signal indicating the actual throughput to the user interface 72 for displaying and enabling the operator to drive the tractor 10 with a propelling speed resulting in an appropriate crop feeding rate into the baling chamber 122, or to use this signal for automatic speed control of the tractor.

It is also possible to use this signal for a geo-referenced storing of the throughput values and for automatic stopping the tractor 10 and opening the flap 118 if the signal indicates a crop plug in the crop conveying channel 110. In this case, i.e. once a crop plug or congestion is detected in the crop conveying channel 110, any useful measure for removing the crop plug can be taken, like for example raising the pick-up 112, disengaging crop cutting knives (not shown in FIG. 1) in the crop conveying channel 110, stop the PTO 36 and/or reducing the pressure in the baling chamber 122 by appropriate instructions to an actuator tensioning belts or chains surrounding the baling chamber 122. In this respect, reference is made to the prior art described in U.S. Pat. No. 8 577 559 B2, the contents of which incorporated herein by reference.

The crop throughput values provided by pressure sensor 174 can be fused with additional, predictive crop throughput sensors, for example from a camera (not shown) mounted on the tractor 10 and looking onto the swath 130 and/or from a yield map provided during a previous (combining, mowing and/or swathing operation) in which the amount of crop in the swath 130 was recorded in a geo-referenced manner.

In order to achieve a certain pressure in the rod chamber 148 and/or in the piston chamber 146 (which pressure is during baling to be sensed by pressure sensor 174) during the normal baling operation, which pressure would decrease (in the piston chamber 146) or increase (in the rod chamber 148) in case of higher crop throughput in the crop conveying channel 110, the baler controller 108 would thus instruct third valve 172 (via tractor controller 40) to move from the shown rest position upward and open the first valve 154, while the second valve 156 is also opened, until position sensor 140 indicates that the flap 118 is closed and a predetermined pressure in the piston chamber 146 is sensed by the pressure sensor 174. Then, the valves 154, 15 and 172 are closed again. Thus, during the subsequent field work operation the rod chamber 148 contains a certain pressure, an increase of which indicates the amount of crop throughput in the crop conveying channel 110. The sensor 174 could also sense the pressure in the piston chamber 146 (pressurized in the manner as indicated), which decreases due to crop throughput.

In another embodiment, the desired pressure in the rod chamber 148 can be optionally achieved by means of a fourth valve 176 and a pressure relief valve 178, both connected between the rod chamber 148 and the piston chamber 146 in series. The pressure relief valve 178 restricts the pressure in the rod chamber 148 to the desired value and thus the baler controller 108 would not need the signal provided by the pressure sensor 174 for closing the valves, but only the signal from the position sensor 140.

In both embodiments, i.e. with the sensed pressure in the rod chamber 148 or in the piston chamber 146 controlled by sensor 174 or by pressure relief valve 178, the described procedure for providing the desired pressure in the respective chamber 148 or 146 can be performed during a harvesting operation once one or more of the following conditions are fulfilled: the amount of crop flow in the crop conveying channel 110 is below a predetermined threshold, the harvesting machine is not moving forward, a predetermined time interval has elapsed and a bale is being wrapped. The re-filling of the respective chamber 148 or 146 with pressure is thus repeated in order to overcome leakage and therefore pressure drop in the hydraulic system. This procedure is to be run when there is no significant crop material flow within the conveying channel 110, which can be detected based on at least one of the mentioned conditions.

It should be noted that the embodiment shown in FIGS. 1 and 2 uses a hydraulic actuator 138 with a housing 152 rigidly connected to the frame 114 of the baler 12, and a lever arm 136 pivotally mounted to the piston rod and to the flap 118. Instead of this, any useful connection arrangement between actuator 138 and flap 118 can be used. For example, the hydraulic actuator 138 could be turned by 180° and the piston rod connected pivotally to the frame 114 and the housing 152 connected to lever arm 136, with a pivot between housing 152 and lever arm 136 and/or between lever arm 136 and flap 118. In other embodiments, a parallelogram mechanism can be connected between the actuator 138 and the flap 118 to move the flap 118 between an open and a closed position. In a further embodiment, lever arm 136 could be connected to flap 118 at pivot axis 135, such that rotation of lever arm 136 in FIG. 2 in the anticlockwise direction opens flap 118 and vice versa.

It should also be noted that the second valve 156 allows to use the third valve 172 for purposes different from closing the flap 118, since it closes the connection between the third valve 172 and the second chamber 146 during normal harvesting operations. Thus, the third valve 172 can then provide hydraulic fluid for example for controlling the position of the pick-up 112 or retractable cutter knifes in the crop conveying channel 110. If such functions are not present or performed by other hydraulic circuits, it would be possible to replace the second valve 156 by a line, or just to open it during harvesting operation and close it only once required. The same applies to first valve 154, since in this case, it could also be omitted and its function described above would be provided by the third valve 172.

In case that the actuators 138 are single-acting cylinders (with the mechanical arrangement changed such that flap 118 is closed by pressure in the piston chamber 146) the second valve 156 would also be omitted. It would also be possible to use the actuators 138 in the embodiment of FIG. 2 as a single-acting cylinder, only filling the rod chamber 148 with hydraulic fluid for closing the flap 118 (and omitting the second valve 156), while the flap 118 would open due to gravitation.

The invention claimed is:

1. A crop throughput sensing system for a harvesting machine, comprising:
   a crop conveying channel with a flap coupled to a hydraulic actuator to move the flap between a closed position and an opened position;
   a pressure sensor to sense a hydraulic pressure in the hydraulic actuator;
   a hydraulic system operatively coupled to the hydraulic actuator, the hydraulic system including:
   a first valve fluidly coupled to a first chamber of the hydraulic actuator;
   a second valve fluidly coupled to a second chamber of the hydraulic actuator; and a third valve fluidly coupled to the first valve and the second valve, the third valve to selectively couple one of the first valve or the second valve to a fluid source; and an electronic control unit to determine, based on the hydraulic pressure, an amount of crop through the crop conveying channel per unit of time.

2. The crop throughput sensing system of claim 1, wherein the hydraulic actuator is a hydraulic cylinder, the hydraulic cylinder coupled to the flap such that pressurization of the first chamber biases the flap in the closed position, wherein the pressure sensor is in fluid connection with the first chamber.

3. The crop throughput sensing system of claim 1, wherein the first valve is closed during a harvesting operation.

4. The crop throughput sensing system of claim 1, wherein the hydraulic actuator is a hydraulic cylinder, the hydraulic cylinder coupled to the flap such that pressurization of the first chamber biases the flap in the closed position and pressurization of the second chamber provides an opening force to the flap, wherein the pressure sensor is in fluid connection with at least one of the first chamber or the second chamber.

5. The crop throughput sensing system of claim 1, wherein at least one of (a) the first valve is closed during a harvesting operation, or (b) the second valve is closed during the harvesting operation.

6. The crop throughput sensing system of claim 5, wherein at least one of the first valve or the second valve are controlled by the electronic control unit to control a position of the flap by actuation of the third valve and at least one of the first valve or the second valve.

7. The crop throughput sensing system of claim 6, wherein the electronic control unit is to open at least one of the first valve or the second valve before start of the harvesting operation and, with the at least one of the first valve or the second valve open, control the third valve to provide a predetermined pressure in the first chamber and close at least one of the first valve or the second valve for the harvesting operation.

8. The crop throughput sensing system of claim 7, wherein the electronic control unit is to open at least one of the first valve or the second valve during the harvesting operation and control the third valve to provide the predetermined pressure in the first chamber and to close at least one of the first valve or the second valve when at least one of (a) the amount of crop through the crop conveying channel is below a predetermined threshold, (b) the harvesting machine is not moving forward, (c) a predetermined time interval has elapsed, or (d) a bale is being wrapped.

9. The crop throughput sensing system of claim 6, wherein the electronic control unit is to open at least one of the first valve or the second valve before start of the harvesting operation or during the harvesting operation and, with the at least one of the first valve or the second valve open, a pressure relief valve to provide a predetermined pressure in the first chamber and close at least one of the first valve or the second valve for the harvesting operation.

10. The crop throughput sensing system of claim 9, wherein the electronic control unit is to open at least one of the first valve or the second valve during the harvesting operation and, with the at least one of the first valve or the second valve open, the pressure relief valve to provide the predetermined pressure in the first chamber and to close the at least one of the first valve or the second valve when at least one of (a) the amount of crop through the crop conveying channel is below a predetermined threshold, (b) the harvesting machine is not moving forward, (c) a predetermined time interval has elapsed, or (d) a bale is being wrapped.

11. The crop throughput sensing system of claim 1, wherein the crop conveying channel is located on a baler downstream a crop feeding rotor and upstream a baling chamber.

12. The crop throughput sensing system of claim 1, wherein the flap is pivotable around an axis extending transversely to a longitudinal axis of the crop conveying channel and the hydraulic actuator is connected to the flap by a lever arm.

13. The crop throughput sensing system of claim 1, wherein the pressure sensor has a signal output connected to the electronic control unit to, based on the signal output of the pressure sensor, at least one of: (a) store pressure values or throughput values derived therefrom in a geo-referenced manner, (b) control a forward speed of the harvesting machine, (c) command an actuator to at least one of open the flap, raise a pick-up, disengage crop cutting knifes in the crop conveying channel, stop a PTO driving the harvesting machine, or reduce a pressure in a baling chamber in response to a pressure of the crop within the crop conveying channel acting onto the flap exceeding a threshold value, or (d) control a user interface at an operator station to display a throughput value.

14. A harvesting machine comprising:
    a crop conveying channel with a movable bottom flap coupled to a hydraulic actuator to a position of the movable bottom flap; and
    a crop throughput sensing arrangement including:
        a pressure sensor to sense a hydraulic pressure in the hydraulic actuator;
    a hydraulic system operatively coupled to the hydraulic actuator, the hydraulic system including:
        a first valve fluidly coupled to a first chamber of the hydraulic actuator;
        a second valve fluidly coupled to a second chamber of the hydraulic actuator; and
        a third valve fluidly coupled to the first valve and the second valve, the third valve to selectively couple one of the first valve or the second valve to a fluid source; and
    an electronic control unit to determine, based on the hydraulic pressure, an amount of crop through the crop conveying channel per unit of time.

15. The crop throughput sensing system of claim 1, wherein the third valve is movable between a first position, a second position, and a third position, the third valve in the first position to direct fluid to the first valve, the third valve in the second position to direct fluid to the second valve, and the third valve in the third position to prevent fluid flow to the first valve and the second valve.

16. The crop throughput sensing system of claim 15, wherein the electronic control unit is to, in response to determining that the amount of crop through the crop conveying channel per unit of time satisfies a threshold, move the flap to the opened position by (a) opening the first valve and the second valve and (b) moving the third valve to the first position.

* * * * *